United States Patent
Fieglein (10) Patent No.: US 11,620,638 B2
(45) Date of Patent: Apr. 4, 2023

(54) METHODS, SYSTEMS, AND DEVICES FOR LOADING CURRENCY INTO AN ELECTRONIC WALLET

(71) Applicant: Wayne Fueling Systems LLC, Austin, TX (US)

(72) Inventor: Henry Fieglein, Cedar Park, TX (US)

(73) Assignee: Wayne Fueling Systems LLC, Austin, TX (US)

( * ) Notice: Subject to any disclaimer, the term of this patent is extended or adjusted under 35 U.S.C. 154(b) by 219 days.

(21) Appl. No.: 15/798,861

(22) Filed: Oct. 31, 2017

(65) Prior Publication Data
US 2019/0130389 A1   May 2, 2019

(51) Int. Cl.
| | |
|---|---|
| G06Q 20/36 | (2012.01) |
| G07F 19/00 | (2006.01) |
| G06Q 20/28 | (2012.01) |
| G06Q 20/32 | (2012.01) |
| G06Q 30/06 | (2023.01) |
| G06Q 20/40 | (2012.01) |
| G07F 15/00 | (2006.01) |

(52) U.S. Cl.
CPC .............. *G06Q 20/36* (2013.01); *G06Q 20/28* (2013.01); *G06Q 20/322* (2013.01); *G06Q 20/326* (2020.05); *G06Q 20/40* (2013.01); *G06Q 30/06* (2013.01); *G07F 19/202* (2013.01); *G07F 15/001* (2013.01)

(58) Field of Classification Search
CPC ...... G06Q 20/36; G06Q 20/40; G06Q 20/326; G06Q 20/28; G06Q 20/322; G06Q 30/06; G07F 15/001; G07F 19/202
USPC ......................................................... 705/41
See application file for complete search history.

(56) References Cited

U.S. PATENT DOCUMENTS

| | | | |
|---|---|---|---|
| 6,116,505 A * | 9/2000 | Withrow | G07F 7/025 235/378 |
| 8,925,808 B2 | 1/2015 | Harrell | |
| 9,195,984 B1 * | 11/2015 | Spector | G06Q 20/367 |
| 9,276,910 B2 | 3/2016 | Tang et al. | |
| 10,332,083 B2 * | 6/2019 | Williams | G06Q 20/3278 |

(Continued)

FOREIGN PATENT DOCUMENTS

WO   WO-2013040169 A1 *   3/2013   ........... G06Q 20/202

OTHER PUBLICATIONS

L. Terán et al., "Public electronic payments: A case study of the electronic cash system in Ecuador," 2016 Third International Conference on eDemocracy & eGovernment (ICEDEG), 2016, pp. 65-70. (Year: 2016).*

Amoroso et al.: "Building a Research Model for Mobile Wallet Consumer Adoption: The Case of Mobile Suica in Japan," Journal of Theoretical and Applied Electronic Commerce Research, vol. 7, No. 1, Jan. 1, 2012, pp. 3-14, XP055562243, DOI: 10.4067/S0718-18762012000100008.

(Continued)

*Primary Examiner* — Hani M Kazimi
*Assistant Examiner* — Alison L. Lamb
(74) *Attorney, Agent, or Firm* — Mintz Levin Cohn Ferris Glovsky and Popeo, PC (57) ABSTRACT

Various methods, systems, and devices for loading currency into an electronic wallet are provided. In general, a currency acceptance terminal can be configured to accept currency from a user for loading into the user's electronic wallet, which may be used to purchase products from a merchant. The currency acceptance terminal can be unmanned such that the currency can be accepted and loaded into the electronic wallet without a cashier or other employee handling the currency or the currency acceptance terminal.

16 Claims, 3 Drawing Sheets

(56) References Cited

U.S. PATENT DOCUMENTS

| | | | |
|---|---|---|---|
| 2009/0320106 A1* | 12/2009 | Jones | G06Q 40/02 |
| | | | 726/5 |
| 2012/0290416 A1 | 11/2012 | Luevane et al. | |
| 2013/0246171 A1* | 9/2013 | Carapelli | G06Q 20/325 |
| | | | 705/14.51 |
| 2014/0100692 A1* | 4/2014 | Chittenden, Jr. | G07F 15/001 |
| | | | 700/236 |
| 2014/0337234 A1 | 11/2014 | Tang et al. | |
| 2017/0046679 A1* | 2/2017 | Gotlieb | G06Q 20/34 |
| 2017/0109722 A1 | 4/2017 | Morris et al. | |
| 2017/0193716 A1 | 7/2017 | Wittliff, III | |
| 2017/0308964 A1 | 10/2017 | Morris et al. | |
| 2017/0329773 A1 | 11/2017 | Fieglein et al. | |
| 2018/0365744 A1* | 12/2018 | Lennon | G07F 17/0014 |

OTHER PUBLICATIONS

Extended European Search Report for EP App. No. 18212205.1 dated Mar. 14, 2019 (7 pages).

Remy Magnier-Watanabe: "An Institutional Perspective of Mobile Payment Adoption: The Case of Japan," 2014 47th Hawaii International Conference on System Sciences, Jan. 6, 2014, pp. 1043-1052, XP055532641, DOI: 10.1109/HICSS.2014.136, ISBN: 978-1-4799-2504-9.

Heath, A. "How to Pay With Your iPhone at Starbucks" Feb. 1, 2011. <http://www.idownloadblog.com/2011/02/01/how-to-pay-with-your-iphone-at-starbucks/>.

Starbucks Customer Service, "How do I reload my Starbucks Card?" Published Sep. 17, 2012, Updated Jan. 4, 2017. <https://customerservice.starbucks.com/app/answers/detail/a_id/2025>.

Starbucks on the App Store. Jun. 29, 2017.

* cited by examiner

METHODS, SYSTEMS, AND DEVICES FOR LOADING CURRENCY INTO AN ELECTRONIC WALLET

FIELD

The present disclosure relates generally to methods, systems, and devices for loading currency into an electronic wallet.

BACKGROUND

Various systems have been developed that allow a customer to pay for goods and services using an electronic wallet pre-loaded with money. Some merchants provide a physical card associated with a unique identification code that uniquely identifies a customer's electronic wallet. The customer may present the card to the merchant for a purchase, and then the cost of the purchase is deducted from the electronic wallet by scanning or otherwise electronically querying the card to identify the electronic wallet by its unique identification code. The money stored in the electronic wallet decreases as purchases are made, but the money may be replenished. Similarly, initial value may be added to the electronic wallet before any purchases are made.

To load the electronic wallet with money the customer may physically visit the merchant's store and present currency in coins and/or paper money to a cashier or other attendant. The customer must therefore wait in line and interact with a person in order to load money to their electronic wallet with currency. Instead of visiting the merchant's store, the customer may add value to the electronic wallet via an authorized web page or via an authorized app installed on a mobile phone or other electronic device. The web page and app each allow the customer to electronically add value to the electronic wallet via bank account transfer or credit card charge. The customer must therefore provide sensitive information online, i.e., bank account information and/or credit card information, that the customer may not want to submit online for privacy and/or security reasons and/or that the customer may not want associated with the electronic wallet for privacy and/or security reasons. Additionally, a customer cannot add value to the electronic wallet with currency via a web page or app, so the customer's only option to add value to the electronic wallet with currency is to physically visit the merchant's store.

With the proliferation of standalone vending machines and other standalone devices selling products without a cashier or other attendant present, it has become more likely that customers will want to make a purchase using an electronic wallet but not be able to add value to their electronic wallet with currency because they are not at, and may not be able to easily visit, a store with a cashier or other attendant present who can accept the currency and process the electronic wallet loading. The customer may thus be frustrated and/or not make a purchase from the merchant that would otherwise have been made at that time to satisfy both the merchant and customer. Additionally, the merchant's employees must spend time loading currency into customers' electronic wallets instead of spending time on important tasks to increase sales, to reduce line waiting time for customers, and/or to improve customer service, such as processing sales at cash registers and answering customer questions about products for sale.

Accordingly, there remains a need for improved methods, systems, and devices for loading currency into an electronic wallet.

SUMMARY

In general, methods, systems, and devices for loading currency into an electronic wallet are provided.

In one aspect, a payment management system is provided that in one embodiment includes a currency acceptance terminal configured to receive currency in association with an electronic wallet of a user that stores monetary value usable for purchase of at least one of goods and services from a merchant, and a mobile terminal that is separate from and external to the currency acceptance terminal. The currency acceptance terminal is configured to transmit data indicative of a monetary amount of the received currency to the mobile terminal. The mobile terminal is configured to transmit data indicative of the monetary amount to an electronic wallet management system that manages a plurality of electronic wallets including the electronic wallet of a user. The electronic wallet management system is separate from and external to the currency acceptance terminal and the mobile terminal. The mobile terminal is configured to receive data from the electronic wallet management system indicative of the stored monetary value of the electronic wallet of the user, and the mobile terminal is configured to transmit data indicative of payment to be made to the merchant from the electronic wallet of the user for at least one of a good and a service from the mobile terminal to a provider of the at least one of the good and the service that subsequently provides the at least one of the good and the service to the user.

The payment management system can have any number of variations. For example, the currency acceptance terminal can have a secure depository therein that stores the received currency therein. For another example, the received currency can include at least one of paper money and a coin. For yet another example, the currency acceptance terminal can be configured to be unmanned when receiving the currency and transmitting the data indicative of the monetary amount of the received currency to the mobile terminal. For another example, in response to the receipt of the currency, the currency acceptance terminal can be configured to automatically transmit the data indicative of the monetary amount of the received currency to the mobile terminal. For still another example, the provider can be a fuel dispenser, and the least one of the good and the service can be fuel dispensable from the fuel dispenser.

In another aspect, a payment management method is provided that in one embodiment includes receiving currency at a currency acceptance terminal, transmitting data indicative of a monetary amount of the received currency from the currency acceptance terminal to a mobile terminal that is separate from and external to the currency acceptance terminal, and transmitting data indicative of the monetary amount from the mobile terminal to an electronic wallet management system that manages a plurality of electronic wallets including an electronic wallet of a user that stores monetary value usable for purchase of at least one of goods and services from a merchant. The electronic wallet management system is separate from and external to the currency acceptance terminal and the mobile terminal. The payment management method also includes increasing the stored monetary value of the electronic wallet of the user at the electronic wallet management system by the monetary amount.

The payment management method can vary in any number of ways. For example, the payment management method can include, prior to receiving the currency, electronically connecting the mobile terminal and the currency acceptance terminal, such as by using an app installed on the mobile terminal or by verifying an identity of the user using an input provided to the currency acceptance terminal by the user, the input including at least one of a touch input to a touchscreen display of the currency acceptance terminal and a biometric input to a biometric reader of the currency acceptance terminal.

For another example, the received currency can be deposited in a secure depository within the currency acceptance terminal. For yet another example, wherein the received currency can include at least one of paper money and a coin. For still another example, the currency acceptance terminal can be unmanned. For another example, the electronic wallet management system can be cloud-based and can include a memory storing the plurality of electronic wallets.

For yet another example, the payment management method can include, after increasing the stored monetary value of the electronic wallet of the user, transmitting data indicative of the stored monetary value of the electronic wallet of the user from the electronic wallet management system to the mobile terminal, and the payment management method can include transmitting data indicative of payment to be made to the merchant from the electronic wallet of the user for at least one of a good and a service from the mobile terminal to a provider of the at least one of the good and the service that subsequently provides the at least one of the good and the service to the user. In at least some embodiments the provider is unmanned and automatically provides the at least one of the good and the service to the user in response to the payment being authorized.

For still another example, the stored monetary value can be usable for purchase of at least fuel dispensable from a fuel dispenser, the fuel dispenser can be separate from and external to the currency acceptance terminal and the mobile terminal, and the payment management method can further include, after increasing the stored monetary value of the electronic wallet of the user, transmitting data indicative of the stored monetary value of the electronic wallet of the user from the electronic wallet management system to the mobile terminal. The payment management method can also include transmitting data indicative of payment to be made to the merchant from the electronic wallet of the user for the fuel from the mobile terminal to the fuel dispenser, and, after transmitting the data indicative of the payment, dispensing the fuel from the fuel dispenser. The payment management method can also include, after transmitting the data indicative of the payment, authorizing the payment prior to dispensing the fuel, the authorizing including the fuel dispenser authorizing the payment with the electronic wallet management system. In at least some embodiments the currency acceptance terminal can be unmanned and the fuel dispenser can be unmanned.

In another embodiment, a payment management method includes receiving at a mobile terminal data from an unmanned currency acceptance terminal that is indicative of a monetary value of currency received by and stored in the currency acceptance terminal, transmitting from the mobile terminal to a cloud-based electronic wallet management system data indicative of the monetary value of the received currency and data indicative of an electronic wallet that is uniquely associated with a user of the mobile terminal and that is stored at the cloud-based electronic wallet management system, receiving at the mobile terminal data from the cloud-based electronic wallet management system data indicative of the electronic wallet having been updated to reflect the monetary value of the currency, transmitting from the mobile terminal to a provider of at least one of a good and service data indicative of payment from the electronic wallet for the at least one of the good and the service, and receiving at the mobile terminal data from the provider indicative of the at least one of the good and the service having been paid for from the electronic wallet and having been provided to the user from the provider.

The payment management method can have any number of variations. For example, the provider can be a fuel dispenser, the good can be fuel, and the currency can include at least one of paper money and a coin. For another example, the provider can be a vending machine. For yet another example, the electronic wallet management system can be cloud-based. For another example, the received currency can be deposited in a secure depository within the unmanned currency acceptance terminal.

For still another example, the payment management method can include, prior to the receiving at the mobile terminal the data from the unmanned currency acceptance terminal, electronically connecting the mobile terminal and the unmanned currency acceptance terminal, such as by using an app installed on the mobile terminal or by verifying an identity of the user using an input provided to the unmanned currency acceptance terminal by the user, the input including at least one of a touch input to a touchscreen display of the currency acceptance terminal and a biometric input to a biometric reader of the currency acceptance terminal.

Non-transitory computer program products (e.g., physically embodied computer program products) are provided that store instructions, which when executed by one or more data processors of one or more computing systems, causes at least one data processor to perform operations herein. Similarly, computer systems are also provided that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

BRIEF DESCRIPTION OF DRAWINGS

This invention will be more fully understood from the following detailed description taken in conjunction with the accompanying drawings, in which.

DETAILED DESCRIPTION

Certain exemplary embodiments will now be described to provide an overall understanding of the principles of the structure, function, manufacture, and use of the devices and methods disclosed herein. One or more examples of these embodiments are illustrated in the accompanying drawings. Those skilled in the art will understand that the devices and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention.

Further, in the present disclosure, like-named components of the embodiments generally have similar features, and thus within a particular embodiment each feature of each like-named component is not necessarily fully elaborated upon. Additionally, to the extent that linear or circular dimensions are used in the description of the disclosed systems, devices, and methods, such dimensions are not intended to limit the types of shapes that can be used in conjunction with such systems, devices, and methods. A person skilled in the art will recognize that an equivalent to such linear and circular dimensions can easily be determined for any geometric shape.

Various exemplary methods, systems, and devices for loading currency into an electronic wallet are provided. In general, a currency acceptance terminal can be configured to accept currency from a user for loading into the user's electronic wallet, which may be used to purchase products from a merchant. The currency acceptance terminal can be unmanned such that the currency can be accepted and loaded into the electronic wallet without a cashier or other employee handling the currency or the currency acceptance terminal. The user may thus add value with currency to the electronic wallet without the merchant's employees spending time loading currency into customers' electronic wallet. An employee may not even be manning the currency acceptance terminal such that the user need not be dependent on the availability of employees to accept currency for loading into an electronic wallet and/or such that the currency acceptance terminal can be used in conjunction with a vending machine or other unmanned device that dispenses products in response to payment for the products so as to provide an automated customer purchase experience. The currency acceptance terminal being unmanned allows the currency acceptance terminal to be located outside of a store that is manned at least part time by at least one employee, which may allow the user to load currency into the electronic wallet without having to enter the store and/or may allow the currency acceptance terminal to be located closer to products available outside of the store, e.g., fuel available at fuel dispensers outside of a fueling station store, air for tires available from an air supply station outside of a store, water and other cleaning agents available at a car wash station outside of a store, a car's run through an automated car wash machine, goods in a vending machine that is located outside of a store, etc.

The currency acceptance terminal being configured to accept currency from the user for loading into the user's electronic wallet may allow the user to use currency to increase funds in the electronic wallet without having to present the currency to a cashier or other attendant at a store for loading into the user's electronic wallet. The user may thus avoid a usury cost that would be incurred by presenting the currency to the cashier or other attendant for loading into the user's electronic wallet. Similarly, the currency acceptance terminal being configured to accept currency from the user for loading into the user's electronic wallet may allow the user to use currency to increase funds in the electronic wallet without having to deposit the currency in a bank account and then adding value to the electronic wallet from the bank account. The user may thus avoid an electronic funds transfer (EFT) cost that would be incurred for the transfer of value from the bank account to the electronic wallet.

The currency acceptance terminal can have a secure depository therein that safely and securely stores currency received by the currency acceptance terminal until the currency is retrieved by an authorized user, e.g., an authorized user who gains authorized access to the depository such as by physical lock and key, electronic password, spin dial combination, biometric authentication, etc. Thus, the currency may be safely stored despite the currency acceptance terminal being unmanned and/or the currency may be safely stored for the periods of time between retrievals of currency from the depository.

The currency acceptance terminal can be configured to electronically communicate with a mobile terminal of a user, such as a mobile phone, a mobile tablet, an electronic terminal mounted in the user's vehicle (e.g., mounted in-dash, etc.), etc. The currency acceptance terminal can be configured to communicate to the mobile terminal a monetary value of currency received by the currency acceptance terminal. The mobile terminal can be configured to cause the electronic wallet associated with the user to be updated to include the monetary value of the currency, e.g., increase the stored value of the electronic wallet by the monetary value. The currency acceptance terminal may thus be a "dumb" terminal unable to update the electronic wallet on its own, which may facilitate integrating the currency acceptance terminal into existing electronic wallet programs of different merchants since the currency acceptance terminal need not be manufactured or programmed to satisfy the particular security and/or other requirements of any one specific electronic wallet program, and/or may help bolster and satisfy user expectations of privacy and security since a device under the user's control, e.g., the mobile terminal, manages the updating of the electronic wallet instead of the currency acceptance terminal, which is outside of the user's control, managing the updating. The mobile terminal being configured to cause the electronic wallet associated with the user to be updated to include the monetary value of the currency may facilitate integration of security updates, operating system updates, and other updates into a merchant's electronic wallet program since an app installed on the mobile terminal that manages the electronic wallet updating can be updated similar to how any other changes to the electronic wallet program can be implemented, such as updates to the electronic wallet program's privacy policy or a change in the electronic wallet program's rewards based on how much currency is loaded at one time, e.g., changing bonus value from 5% to 10% when the customer adds value via currency totaling over a certain amount (i.e., receiving at least $20.00 of currency and adding the value received plus 10% of the value to the electronic wallet as an incentive for the customer to load more money into the electronic wallet in a single session).

Figure 1:
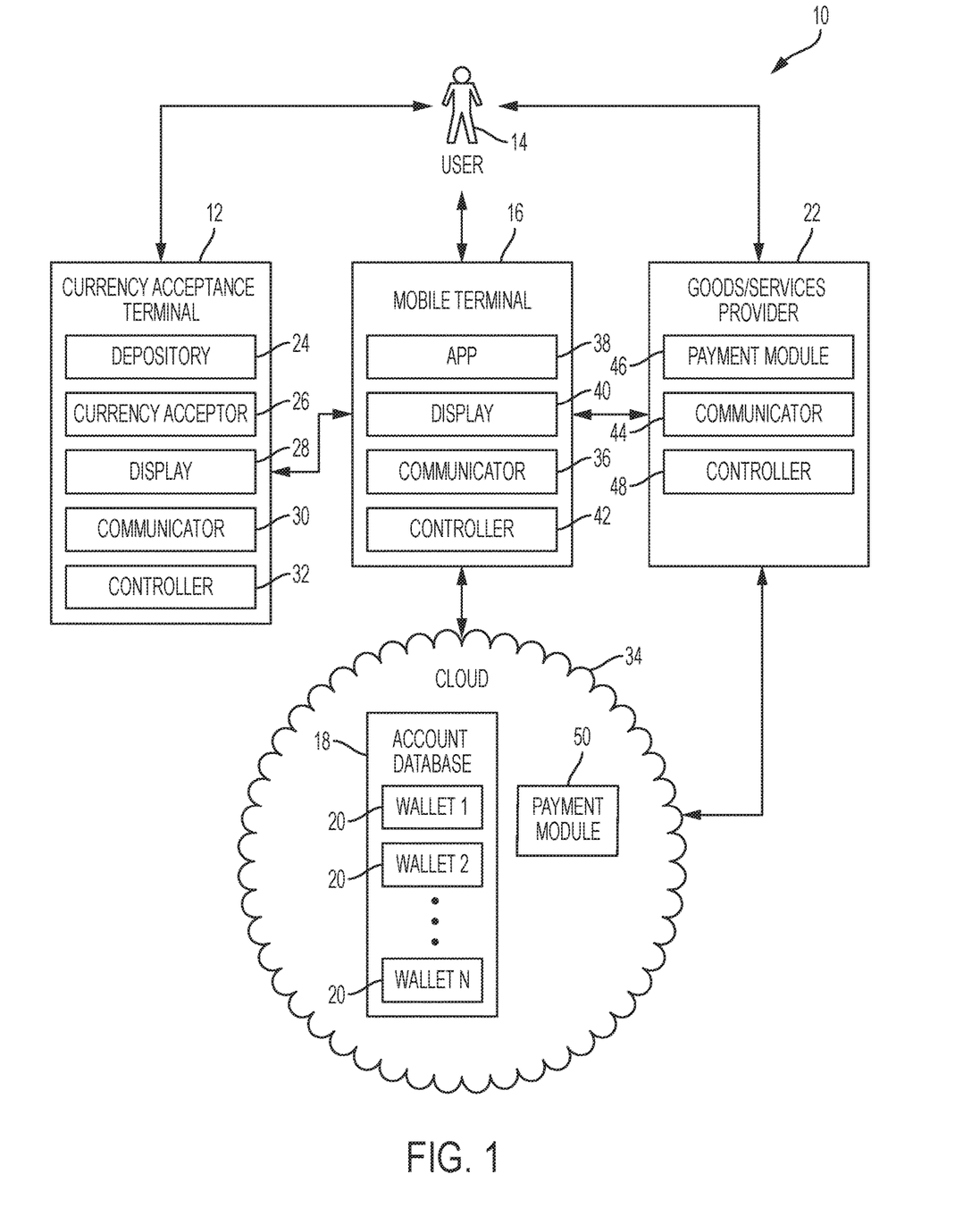
FIG. 1 is a schematic view of one embodiment of a system that includes a currency acceptance terminal configured to receive currency for loading into an electronic wallet.

FIG. 1 illustrates one embodiment of a system 10 that includes a currency acceptance terminal 12 configured to receive currency for loading into an electronic wallet. In general, the currency acceptance terminal 12 is configured to receive currency from a user 14 and transmit data indicative of the received currency to a mobile terminal 16 associated with the user 14. The mobile terminal 16 is configured to transmit data indicative of the received currency to an electronic wallet management system, which in this illustrated embodiment is a cloud-based system including an account database 18 for a plurality of electronic wallets 20. Each of the electronic wallets 20 is associated with a different account and each stores therein data indicative of a monetary value available for purchases of goods and services. The electronic wallet management system is configured to update the wallet 20 associated with the user 14 to reflect the received currency. The mobile terminal 16 is also configured to communicate with a provider 22 of goods and/or services to facilitate payment for the goods and/or services with the value stored in the wallet 20 associated with the user 14, thereby allowing the user 14 to receive the paid-for goods and/or services from the provider 22.

The currency acceptance terminal 12, the mobile terminal 16, and the provider 22 are separate from and external to each other. In other words, each of the currency acceptance terminal 12, the mobile terminal 16, and the provider 22 are standalone devices. The currency acceptance terminal 12, the mobile terminal 16, and the provider 22 being separate from and external to each other may facilitate modularity of the system 10 because each of the currency acceptance terminal 12, the mobile terminal 16, and the provider 22 can be upgraded, repaired, or replaced without affecting any of the other devices, may facilitate addition of the currency acceptance terminal 12 to existing sites that allow payments via electronic wallet, and/or may allow a merchant to customize location of the currency acceptance terminal 12 relative to the provider 22. For example, in one embodiment in which the provider 22 is a fuel dispenser, one merchant may have a plurality of fuel dispenser islands at a fueling station site and desire to locate one currency acceptance terminal 12 between two fuel dispensers on each of the fuel dispenser islands so a currency acceptance terminal 12 is next to any fuel dispenser chosen by a user, while another merchant may desire to locate the currency acceptance terminal 12 on its own island near a plurality of fuel dispenser islands at a fueling station site so available real estate at the fuel dispenser islands can instead be used for display of products for sale. In some embodiments, the currency acceptance terminal 12 can be remote from the provider 22 in order to allow the user 14 to load currency into their electronic wallet 20 in anticipation of a later visit to the provider 22, such as the currency acceptance terminal 12 being located in a supermarket and the provider 22 being located at a separate location nearby.

The currency acceptance terminal 12 and the provider 22 are each configured to be unmanned during use. The currency acceptance terminal 12 and the provider 22 may thus perform their functions and the user 14 may interact therewith without a cashier or other authorized attendant monitoring either of the currency acceptance terminal 12 or the provider 22. The mobile terminal 16 is configured to be manned by the user 14 during use.

The currency acceptance terminal 12 is a standalone device configured to be physically secured to a structure, such as a wall or the ground, similar to an automated teller machine (ATM). The currency acceptance terminal 12 being secured to the structure may help prevent unauthorized transport and/or theft of the currency acceptance terminal 12. In other embodiments, the currency acceptance terminal 12 can be a heavy standalone device that is difficult to move, similar to a standalone vending machine such as for soft drinks, to help prevent unauthorized transport and/or theft of the currency acceptance terminal 12.

As shown in FIG. 1, the currency acceptance terminal 12 includes a depository 24, a currency acceptor 26, a display 28, a communicator 30, and a controller 32. The depository 24 is a secure area, e.g., a safe, within the currency acceptance terminal 12 configured to store currency therein that is received by the currency acceptance terminal 12 via the currency acceptor 26. The depository 24 includes a security mechanism configured to prevent access to the contents of the depository 24, e.g., to the currency deposited therein, except to authorized personnel. The security mechanism can have any of a variety of configurations, such as a physical lock and key, electronic password, spin dial combination, biometric authentication, etc. In embodiments in which the security mechanism is electronic, such as with use of an electronic password or biometric authentication, the controller 32 is configured to control the security mechanism. In at least some embodiments, the currency acceptance terminal 12 can include a timer configured to allow the depository 24 to be accessed at only certain predetermined times to increase security of the depository, e.g., only allow the security mechanism to allow access at the certain predetermined times such as by only accepting biometric input or an electronic password at the certain predetermined times. If the currency acceptance terminal 12 includes a timer, the controller 32 can control the timer.

The depository 24 can be a single area configured to store therein all currency received by the currency acceptance terminal 12. Alternatively, the depository 24 can include a plurality of individual areas for different types of currency, e.g., one area for coins and another area for paper money, different areas for each denomination of currency received, etc. If the depository 24 includes a plurality of individual areas, each of the individual areas can be configured to be separately securely accessed by an authorized attendant, or a single access point may allow access to all of the individual areas of the depository 24.

The currency acceptor 26 is configured to receive currency therein from the user 14. The currency acceptor 26 can be configured to receive coins and/or paper money. In an exemplary embodiment, the currency acceptor 26 is configured to receive both coins and paper money, e.g., have one slot to accept coins and another slot to accept paper money. The currency acceptor 26 is in communication with the depository 24 to allow currency input into the currency acceptor 26 to travel to and be deposited in the depository 24.

The display 28 is configured to show information thereon. The information can include, for example, instructions on how to use the currency acceptance terminal 12, error messages (e.g., currency is being returned to the user 14 for a reason such as being invalid currency, input currency being too damaged for accurate determination of its denomination, depository 24 is full and cannot accept more currency, etc.), amount of currency input by the user 14 thus far to the currency acceptor 26 in this currency acceptance session, etc. The display 28 in the illustrated embodiment is a touchscreen configured to receive touch input from the user 14 as well as to show information thereon, but other types of displays can be used. For example, the touchscreen can be configured to prompt the user to touch a box for "yes" or a box for "no" indicating whether the user 14 has additional currency to input. For another example, the touchscreen can be configured to prompt the user to cancel the transaction at any time in order for the currency acceptance terminal 12 to return to the user 14 currency input by the user 14 thus far in this currency acceptance session. The currency acceptance terminal 12 can be configured to return the currency via a return slot, which may be the currency acceptor 26 if also configured to return currency, may be a dedicated return slot for both coins and paper money, may be one dedicated return slot that returns coins only (in which case any paper money input by the user 14 is returned in equal value in coins), or may be dedicated return slot that returns coins and another dedicated return slot that returns paper money. For yet another example, the touchscreen can be configured to prompt the user 14 to indicate whether all currency inserted into the currency acceptor 26 is desired to be loaded into the electronic wallet 20 associated with the user 14 or if the user 14 would only like a portion of the inserted monetary amount to be loaded into the electronic wallet 20 associated with the user 14. The return slot can provide change to the user 14 if the user 14 desires change, e.g., the user 14 inserts a $20 bill into the currency acceptor 26 but indicates via input to the touchscreen that only $15 should be loaded into the electronic wallet 20 associated with the user 14 such that $5 should be returned to the user 14.

The display 28 can be configured to show media thereon when the currency acceptance terminal 12 is not in use by the user 14 or any other user. The media can include, for example, advertisements, local weather information, local traffic information, live sports scores, streaming television, etc. The media can be a static collection of media pre-stored on the currency acceptance terminal 12, e.g., in a memory thereof, such that the media displayed on the display 28 is locally stored media. The media can instead be dynamic media that is configured to be periodically updated and/or replaced to help keep the media fresh and up to date, such as by the currency acceptance terminal 12 being configured to access media from the cloud 34 via the communicator 30. In embodiments in which the display 28 is configured to show media thereon, the controller 32 can control the display of the media, such as by controlling the scrolling of different advertisement images and/or videos on the display 28, determining that media should begin being displayed on the display 28 because the currency acceptance terminal 12 has not received any currency or any user input for a predetermined amount of time (e.g., five minutes has passed since the last currency receipt or user input, etc.) and/or by controlling the gathering of media for display from the cloud 34. Various embodiments of displaying media are described further in U.S. patent application Ser. No. 15/153,966 entitled "Management Of Fuel Dispenser Media" filed May 13, 2016 and in U.S. patent application Ser. No. 15/476,112 entitled "Intelligent Fuel Dispensers" filed Mar. 31, 2017, which are hereby incorporated by reference in their entireties.

Instead of or in addition to the display 28, the currency acceptance terminal 12 can include other input/output devices configured to facilitate interaction with the user 14. For example, the currency acceptance terminal 12 can include a speaker configured to output audio. For another example, the currency acceptance terminal 12 can include a numeric keypad configured for the user 14 to, e.g., enter a numerical amount of desired change, enter a personal identification number (PIN) number to verify the user's identity, to respond to prompts on the display 28 if the display 28 is not a touchscreen or if the user 14 would rather use a keypad than the touchscreen, etc.

The communicator 30 is configured to wirelessly communicate with another communicator, e.g., a communicator 36 of the mobile terminal 16. The communicator 30 can include, e.g., a transceiver communicating via Bluetooth protocol, cellular protocol, WIFI protocol, near field communication (NFC), TCP/IP, and/or a radio frequency identification (RFID) protocol.

The communicator 30 is configured to electronically connect the currency acceptance terminal 12 with another device, e.g., the mobile terminal 16. The communicator 30 can connect with the other device in any of a number of ways. For example, the communicator 30 can include an NFC reader, and the user 14 can establish communication of the mobile terminal 16 with the currency acceptance terminal 12 by moving the mobile terminal 16 into effective range of the NFC reader. The mobile terminal 16 has an app 38 installed thereon configured to facilitate the connection, as will be appreciated by a person skilled in the art. For another example, the communicator 30 can include a Bluetooth Low Energy (BLE) module configured to advertise the currency acceptance terminal 12 by emitting a signal, and the mobile terminal 16, e.g., the communicator 36 thereof, can be configured to detect the emitted signal and thus determine that the mobile terminal 16 is in proximity to the currency acceptance terminal 12 and that communication between the mobile terminal 16 and currency acceptance terminal 12 should begin to be established.

The communication between the communicator 36 of the mobile terminal 16 and the communicator 30 of the currency acceptance terminal 12 can be established in any of a variety of ways and can be secured using any of a variety of security techniques, as will be appreciated by a person skilled in the art. Various embodiments of connection and security techniques are further described in U.S. Pat. Pub. No. 2014/0337234 entitled "Systems And Methods For Secure Communication" filed May 9, 2013, U.S. Pat. No. 9,276,910 entitled "Systems And Methods For Convenient And Secure Mobile Transactions" filed Nov. 19, 2013, and U.S. patent application Ser. No. 15/314,840 entitled "Methods And Systems For Communication Between A Fuel Dispenser And A Mobile Device" filed Nov. 29, 2016, which are hereby incorporated by reference in their entireties.

When the currency acceptance terminal 12 is connected to the mobile terminal 16, the communicator 30 can communicate data thereto. For example, the communicator 30 is configured to transmit data indicative of a monetary amount of currency received by the currency acceptance terminal 12, e.g., the monetary amount of currency input to the currency acceptor 26 by the user 14. In an exemplary embodiment, the communicator 30 communicates the data indicative of the monetary amount of currency to the communicator 36 of the mobile terminal 16, which then communicates data elsewhere, e.g., to the cloud 34, so the user's electronic wallet 20 can be updated in accordance with the received amount of currency, as discussed herein.

The controller 32 is configured to control the operation of the currency acceptance terminal 12, for example by executing an operating system (OS), device drivers, application programs, and so forth. The controller 32 includes a processor forming part of at least one computing system. The processor can include any type of microprocessor or central processing unit (CPU), including programmable general-purpose or special-purpose microprocessors and/or any of a variety of proprietary or commercially-available single or multi-processor systems. The computing system can also include a memory, which provides temporary or permanent storage for computer-executable instructions to be executed by the processor or for data that is processed by the processor. The display 28 and the communicator 30 can also be considered part of the computing system. The various elements of the computing system can be coupled to one another, such as with a bus system.

The currency acceptance terminal 12 in this illustrated embodiment is a "dumb" terminal that is unable to update the electronic wallet 20 of the user 14 on its own. Instead, as discussed further below, the currency acceptance terminal 12 is configured to communicate data to the mobile terminal 16, which is configured to cause the value of the electronic wallet 20 of the user 14 to increase by the amount of currency input by the user 14 into the currency acceptance terminal 12, as discussed herein.

As shown in FIG. 1, the mobile terminal 16 includes the communicator 36, the app 38, a display 40, and a controller 42. The communicator 36 is generally configured similar to the communicator 30 of the currency acceptance terminal 12, e.g., configured to wirelessly communicate with another communicator, such as the communicator 30 of the currency acceptance terminal 12, a communicator 44 of the provider 22, and a communicator at the cloud 34 (e.g., a communicator for the account database 18).

As mentioned above, the app 38 is installed on the mobile terminal 16. The app 38 can be installed thereon in any of a variety of ways, as will be appreciated by a person skilled in the art. The app 38 is configured to facilitate the connection with the currency acceptance terminal 12, as discussed above, and is configured to facilitate a connection with the provider 22. The mobile terminal 16, e.g., the communicator 36 thereof, can connect with the provider 22, e.g., the communicator 44 thereof, in any of a variety of ways, similar to that discussed above regarding the connection of the currency acceptance terminal 12 and the mobile terminal 16.

The display 40 of the mobile terminal 16 is configured to show information thereon, as will be appreciated by a person skilled in the art. The information can include, for example, instructions on how to use the app 38, messages regarding usage of the currency acceptance terminal 12, messages regarding a status of payment for goods/services from the provider 22, etc. The display 40 in the illustrated embodiment is a touchscreen configured to receive touch input from the user 14 as well as to show information thereon, but other types of displays can be used. Instead of or in addition to the display 40, the mobile terminal 16 can include other input/output devices configured to facilitate interaction with the user 14, similar to that discussed above regarding the currency acceptance terminal 12.

The controller 42 is configured to control the operation of the mobile terminal 16 and includes a processor forming part of at least one computing system, similar to that discussed above regarding the controller 32 of the currency acceptance terminal 12.

As shown in FIG. 1, the provider 22 includes the communicator 44, a payment module 46, and a controller 48. The communicator 44 is generally configured similar to the communicator 30 of the currency acceptance terminal 12, e.g., configured to wirelessly communicate with another communicator, such as the communicator 36 of the mobile terminal 16 and a communicator at the cloud 34 (e.g., a communicator for a payment module 50 at the cloud 34 that authorizes payments for the goods and/or services provided by the provider 22).

The payment module 46 is configured to facilitate user payment for goods and/or services provided by the provider 22 at least for payment by electronic wallet. In at least some embodiments the payment module 46 can be configured to facilitate one or more other forms of user payment input to the provider 22, such as payment by credit card, debit card, gift card, currency, etc., which may provide more flexibility than only allowing for user payment via electronic wallet. For payment via electronic wallet, the payment module 46 is configured to receive data from the mobile terminal 16, e.g., receive at the communicator 44 from the mobile terminal's communicator 36, that uniquely identifies the user's electronic wallet such as via unique identification code. The provider 22, e.g., the communicator 48 thereof, is configured to communicate data that uniquely identifies the user's electronic wallet to the cloud's payment module 50, which determines via query to the account database 18 whether the payment should be approved (e.g., because adequate funds exist in the electronic wallet 20 to cover the purchase cost and the electronic wallet 20 is verified to be an authentic account for the provider 22) or disapproved (e.g., because adequate funds do not exist in the electronic wallet 20 to cover the purchase cost and/or the electronic wallet 20 is not verified to be an authentic account for the provider 22). In at least some embodiments the data from the mobile terminal 16 can also include data indicative of a balance of the user's electronic wallet 20, which may allow the provider 22 to determine without communication with the cloud's payment module 50 whether the user's electronic wallet 20 has sufficient funds to cover the total cost of the user's purchase, which is known to the provider 22 without communication with the cloud's payment module 50. If the electronic wallet 20 lacks sufficient funds, the provider 22 can transmit data indicative of the electronic wallet 20 having insufficient funds to the mobile terminal 16 without having to spend time or resources communicating with the cloud 34. Various embodiments of authorizing payments are further described in U.S. Pat. Pub. No. 2014/0337234 entitled "Systems And Methods For Secure Communication" filed May 9, 2013, U.S. Pat. No. 9,276,910 entitled "Systems And Methods For Convenient And Secure Mobile Transactions" filed Nov. 19, 2013, and U.S. Pat. No. 8,925,808 entitled "Fuel Dispenser Commerce" filed Nov. 13, 2006, which are hereby incorporated by reference in their entireties.

The controller 48 is configured to control the operation of the provider 22 and includes a processor forming part of at least one computing system, similar to that discussed above regarding the controller 32 of the currency acceptance terminal 12.

The provider 22 can include a display and/or other input/output devices configured to facilitate interaction with the user 14, similar to that discussed above regarding the currency acceptance terminal 12. For example, the provider 22 can include a display configured to indicate to the user 14 when payment via the user's electronic wallet 20 has been authorized such that the purchased goods and/or services are now available to the user 14 from the provider 22, e.g., the user 14 can begin dispensing fuel (when the provider 22 is a fuel dispenser), the user 14 can begin driving their car through a cash wash (when the provider 22 is a car wash kiosk), the user 14 can now open a door of a vending machine to retrieve their purchased item(s) (when the provider 22 is the vending machine), etc. For another example, the provider 22 as a fuel dispenser can include a display configured to show information thereon related to fuel available for purchase (e.g., fuel grades, fuel prices, progress of fuel currently being dispensed, etc.) and/or to show media thereon similar to that discussed above regarding the display of media on the currency acceptance terminal's display 28.

Figure 2:
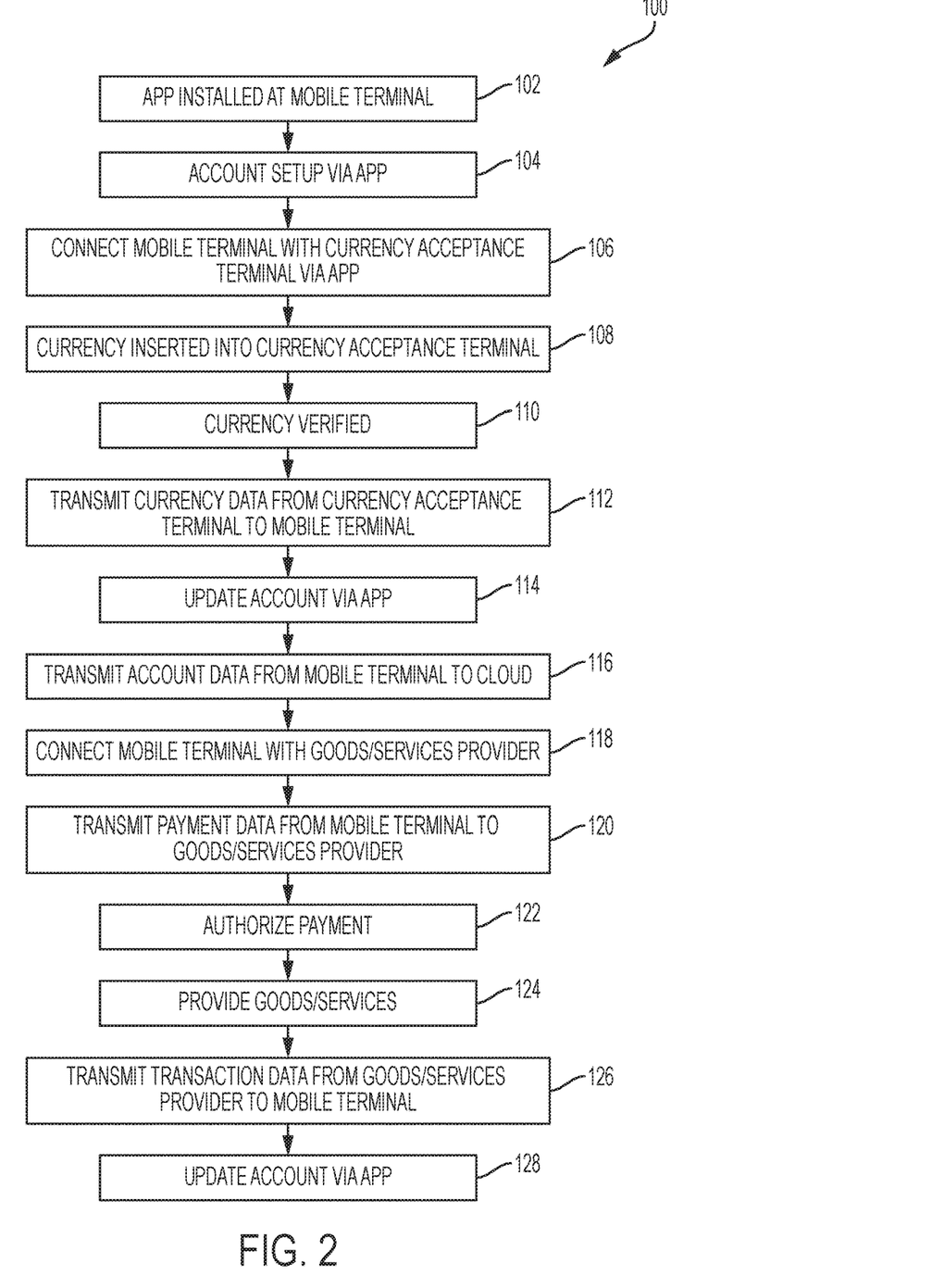
FIG. 2 is a flowchart illustrating one embodiment of a process of managing payment that includes loading currency into an electronic wallet.

FIG. 2 illustrates one embodiment of a process 100 of managing payment that includes loading currency into an electronic wallet. The process 100 is described with respect to the system 10 of FIG. 1 but can be similarly used with other systems.

The process 100 includes the app 38 being installed 102 at the mobile terminal 16, e.g., by the user 14 manually installing the app 38 thereon. In an exemplary embodiment, the app 38 is specific to the merchant associated with the provider 22, e.g., the app 38 is for a specific merchant that sells goods/services via the provider 22. In other embodiments, the app 38 is not specific to a merchant but is instead usable at any merchant who has pre-agreed to accept payment for goods/services via the electronic wallets 20.

The user 14 sets up 104 an account via the app 38 installed on the mobile terminal 16. The setup 104 can include establishing the user's electronic wallet 20 at the account database 18 via the app 38. A unique identification code for the wallet 20 can be assigned and/or generated, and the user 14 can choose a login name and password for access to the electronic wallet 20 via the app 38, e.g., to load value thereon via the app 38 by bank account transfer or credit card charge, to view a current balance of the user's electronic wallet 20, to permanently close the electronic wallet 20, etc.

With the app 38 installed on the mobile terminal 16, the mobile terminal 16 connects 106 with the currency acceptance terminal 12 via the app 38. The connection can be established in any of a variety of ways, as discussed above, such as via NFC tap, BLE connection, etc. As also discussed above, the connection between the mobile terminal 16 and the currency acceptance terminal 12 can be secure.

With the mobile terminal 16 and the currency acceptance terminal 12 connected, the user 14 inserts 108 currency, e.g., coins and/or paper money, into the currency acceptor 26. The user 14 can be prompted when to insert the currency to help prevent premature insertion of currency, e.g., to prevent insertion before the connection is established between the mobile terminal 16 and the currency acceptance terminal 12. The currency acceptance terminal 12 can prompt the user 14 via the display 28 of the currency acceptance terminal 12 and/or the app 38 can prompt the user 14 via the display 40 of the mobile terminal 16. In an exemplary embodiment, as in the process 100, the mobile terminal 16 and the currency acceptance terminal 12 are connected before currency is inserted 108 into the currency acceptance terminal 12, which may help ensure that the inserted 108 currency can be loaded into the user's electronic wallet 20 because the app 38 has been properly installed on the mobile terminal 16 and can thus communicate with the currency acceptance terminal 12 and the cloud 34. In other embodiments, currency can be inserted 108 into the currency acceptance terminal 12 before the mobile terminal 16 and the currency acceptance terminal 12 are connected, which may help assure the user 14 that the currency acceptance terminal 12 is functional and that the currency is acceptable for loading into an electronic wallet 20.

The currency acceptance terminal 12 verifies 110 the currency inserted into the currency acceptor 26. In an exemplary embodiment the currency acceptance terminal 12 verifies 110 each item of currency (e.g., each coin and each bill of paper money) before the next item of currency is inserted in order to promptly notify the user 14, e.g., via the display 28 and/or other input/output device, of any error with the inserted currency and/or to return improper currency to the user 14 before the user 14 inserts more currency. The currency acceptance terminal 12 can verify 110 the currency in any of a number of ways, similar to the currency verification processes used by ATMs and vending machines. The user 14 can indicate to the currency acceptance terminal 12 when the user 14 has completed inserting currency, such as by providing an input via the currency acceptance terminal's touchscreen display 28 or via the app 38 which communicates the user's input to the currency acceptance terminal 12 via the communicator 36. The user 14 can also indicate to the currency acceptance terminal 12 if the user 14 desires change, e.g., if the user 14 inserted more money than should be credited to the user's electronic wallet 20 and that change should be provided to the user 14 via the currency acceptance terminal's return slot, which as mentioned above may be a dedicated return slot or may be the currency acceptor 26.

When the user 14 has finished inserting currency into the currency acceptor 26, the currency acceptance terminal 12 transmits 112 currency data to the mobile terminal 16 that is indicative of a monetary value of the currency inserted into the currency acceptor 26 (minus monetary value of any currency returned to the user 14). For example, if the currency acceptance terminal 12 and the mobile terminal 16 have NFC capabilities, the currency data can be transmitted 112 via tap of the mobile terminal 16 on the NFC interface of the currency acceptance terminal 12. For another example, if the currency acceptance terminal 12 and the mobile terminal 16 have Bluetooth capabilities, the currency data can be transmitted 112 via Bluetooth to the mobile terminal 16 from the currency acceptance terminal 12. In response to the mobile terminal 16 receiving the currency data, the app 38 then updates 114 to reflect the new, pending balance of the user's electronic wallet 20 that can then be shown to the user 14 on the mobile terminal's display 40. In some embodiments, the app 38 does not update 114 at this time, instead waiting to update in response to receipt of confirmation from the cloud 34 that the user's electronic wallet 20 at the account database 18 has been updated.

In response to receiving the currency data from the currency acceptance terminal 12, the mobile terminal 16 transmits 116 account data to the cloud 34 that is indicative of the monetary amount that should be added to the user's electronic wallet 20. The account data also uniquely identifies the user's electronic wallet 20 among the plurality of electronic wallets 20 managed by the account database 18 at the cloud 34, e.g., by transmitting the electronic wallet's unique identification code to the cloud 34, so the correct electronic wallet 20 is updated with the added monetary value.

When the user 14 is ready to make a purchase from the provider 22, the mobile terminal 16 is connected 118 with the provider 22. The connection is shown in this illustrated embodiment as occurring after the transmission 116 of account data from the mobile terminal 16 to the cloud 34, but the connection 118 can occur before the transmission 116 of account data. The connection can be established in any of a variety of ways, as discussed above, such as via NFC tap, BLE connection, etc. As also discussed above, the connection between the mobile terminal 16 and the provider 22 can be secure.

With the mobile terminal 16 and the provider 22 connected, the mobile terminal 16 transmits 120 payment data to the provider 22 that is indicative of the user's electronic wallet 20 to be used to pay for the goods and/or services desired by the user 14. The user 14 can select the desired goods and/or services from the provider 22 before or after the transmission 120 of the payment data.

In response to having both the payment data and the user's selection of goods/services, the payment for the goods/services is authorized 122. This authorization 122 can be accomplished in any of a variety of ways, as discussed above, such as the provider 22 transmitting authorization data to the payment module 50 at the cloud 34 which verifies that the electronic wallet 20 identified by the authorization data is a valid account and has sufficient funds to pay the monetary amount indicated in the authorization data as being needed to purchase the desired goods/services.

In response to the payment being authorized 122, the provider 22 provides 124 the desired goods and/or services to the user 14 and transmits 126 transaction data to the mobile terminal 16 that is indicative of the total cost of the goods/services purchased that has been deducted from the user's electronic wallet 20. The goods/services are provided 124 before the transaction data is transmitted 126 in this illustrated embodiment, but the transaction data can be transmitted 126 before the goods/services are provided 124.

In response to receipt of the transaction data, the app 38 updates 128 to reflect the completed transaction. The app 38 can provide completed transaction information to the user 14 via the mobile terminal's display 40 and/or the provider 22 can provide completed transaction information to the user 14 via the provider's display (should the provider 22 have a display).

Figure 3:
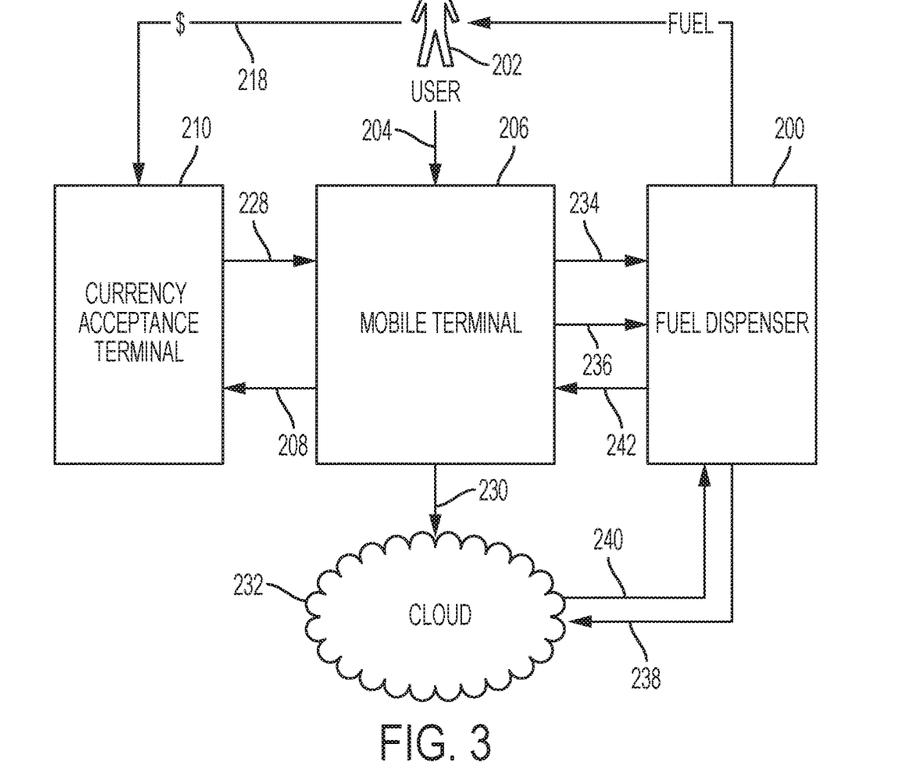
FIG. 3 is a schematic view of one embodiment of a process of managing payment in a system that includes a fuel dispenser.

FIG. 3 illustrates another embodiment of a process of managing payment that includes loading currency into an electronic wallet. The process of FIG. 3 is similar to the process 100 of FIG. 1 and is described with respect to a system where a provider of goods/services is a fuel dispenser 200.

The process of FIG. 3 includes a user 202 starting 204 an app on a mobile terminal 206, which are generally configured and used similar to the app 38 and mobile terminal 16, respectively, of FIG. 1. If the user 202 is not already logged in to the app, e.g., by having a setting on the app that keeps the user 202 logged in, the user 202 logs in to the started app.

Figure 4:
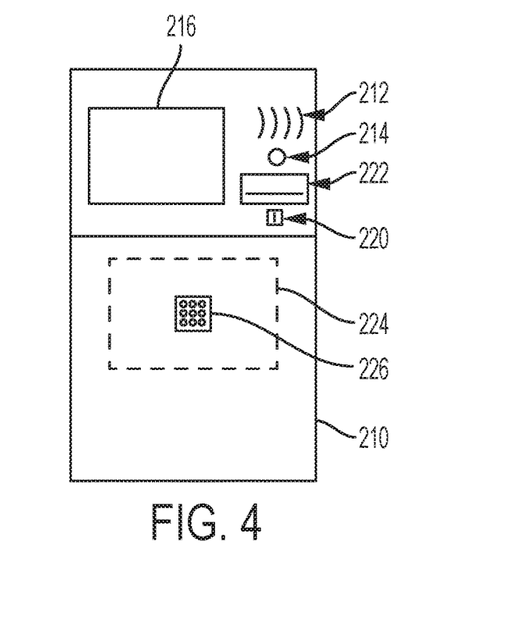
FIG. 4 is a schematic view of a currency acceptance terminal of the system of FIG. 3.

With the app started 204 and the user 202 logged in to the app, the mobile terminal 206 can connect 208 to a currency acceptance terminal 210, which is generally configured and used similar to the currency acceptance terminal 12 of FIG. 1. FIG. 4 also illustrates the currency acceptance terminal 210 of FIG. 3. The connection 208 can be established in any number of ways, as discussed above. For example, the currency acceptance terminal 210 in this illustrated embodiment includes an NFC reader 212 that can facilitate connection 208 with the mobile terminal 206 via NFC tap if the mobile terminal 206 has NFC capability. For another example, the currency acceptance terminal 210 in this illustrated embodiment includes a BLE beacon 214 that can facilitate connection 208 with the mobile terminal 206 if the mobile terminal 206 has BLE capability. For yet another example, the currency acceptance terminal 210 in this illustrated embodiment includes a touchscreen display 216 that can facilitate connection 208 with the mobile terminal 206 via touch input thereto from the user 202.

With the mobile terminal 206 and the currency acceptance terminal 210 connected, the user 202 inserts 218 currency, e.g., coins and/or paper money, into the currency acceptance terminal's currency acceptor. The currency acceptor in this illustrated embodiment include a coin acceptor 220, e.g., a coin slot, configured to accept coins and a note acceptor 222, e.g., a note slot, configured to accept paper money. The currency is shown in dollars in this illustrated embodiment, but other types of currency may be used. In an exemplary embodiment the currency acceptance terminal 210 is configured to accept only one type of currency (e.g., only U.S. dollars, only Canadian dollars, only Euros, etc.), but in other embodiments the currency acceptance terminal 210 can be configured to accept multiple types of currency. For example, the currency acceptance terminal 210 can be configured to accept two different types of currency which may facilitate usage of the currency acceptance terminal 210 near a border where one type of currency is used on one side of the border and another type of currency is used on the other side of the border.

The currency inserted 218 into the currency acceptor and verified as valid currency whose denomination has been determined is deposited in the currency acceptance terminal's depository 224. The currency acceptance terminal 210 in this illustrated embodiment includes a security mechanism 226 in the form of an electronic keypad configured to accept entry of an electronic passcode thereto to gain entry into the depository 224. Access to the electronic keypad may be limited to further enhance security, such as by the electronic keypad being accessible only by opening a cabinet door of the currency acceptance terminal 210 via a second security mechanism, such as a physical lock and key.

When the user 202 has finished inserting currency into the currency acceptance terminal's currency acceptor, the currency acceptance terminal 210 transmits 228 currency data to the mobile terminal 206 that is indicative of a monetary value of the currency inserted into the currency acceptance terminal 210 (minus the monetary value of any currency returned to the user 202). The app at the mobile terminal 202 may then update to reflect the new, pending balance of the user's electronic wallet that includes added monetary value. The currency acceptance terminal 210 in this illustrated embodiment is a "dumb" terminal that is unable to update the electronic wallet of the user 202 on its own. Instead, as discussed herein, the mobile terminal 206 is configured to cause the value of the user's electronic wallet to increase in response to the user's input of currency to the currency acceptance terminal 210.

In response to receiving the currency data from the currency acceptance terminal 210, the mobile terminal 202 transmits 230 account data to the cloud 232 that is indicative of the monetary amount that should be added to the user's electronic wallet stored at the cloud 232.

When the user 202 is ready to make a purchase from the fuel dispenser 200, the mobile terminal 206 is connected 234 with the fuel dispenser 200. The connection can be established in any of a variety of ways, as discussed above. With the mobile terminal 206 and the fuel dispenser 200 connected, the mobile terminal 206 transmits 238 payment data to the fuel dispenser 200 that is indicative of the user's electronic wallet to be used to pay for the goods and/or services desired by the user 202 and available via the fuel dispenser 200, e.g., fuel dispensable from the fuel dispenser 200, a car wash available at the fueling station site that includes the fuel dispenser 200 (e.g., the app updates with a code that the user 202 can enter at the car wash to begin the car wash, or the like), etc. In an exemplary embodiment, the user 202 has selected the goods/services for purchase via the fuel dispenser 200 prior to transmission 238 of the payment data, thereby allowing the fuel dispenser 200 to evaluate whether the user's electronic wallet has sufficient funds for the selected goods/services without any communication with the cloud 232 and, if not, provide immediate notification to the user 202 via the display of the mobile terminal 206 and/or via the fuel dispenser 200 (e.g., via a display thereof, etc.) so that the transaction can be canceled, so an alternate form of payment can be provided in order for the selected goods/services to be provided, or so that some goods/services can be deselected or reduced in quantity to reduce the purchase's total cost to an amount that can be covered by the electronic wallet's available funds.

In response to having both the payment data and the user's selection of goods/services, the payment for the goods/services can be authorized. In this illustrated embodiment, authorization occurs by the fuel dispenser 200 transmitting 238 authorization data to the cloud 232 which verifies that the user's electronic wallet as identified by the authorization data is a valid account and has sufficient funds to pay the monetary amount indicated in the authorization data as being needed to purchase the desired goods/services, and then the cloud 232 transmitting 240 verification data to the fuel dispenser 200 indicating whether the charge has been authorized or not. In response to the payment being authorized, the fuel dispenser 200 provides the desired goods and/or services to the user 202 and transmits 242 transaction data to the mobile terminal 206 that is indicative of the total cost of the goods/services purchased that has been deducted from the user's electronic wallet. In response to receipt of the transaction data, the app updates to reflect the completed transaction. In response to the payment not being authorized, the fuel dispenser 200 is prevented from providing the desired goods and/or services to the user 202 (unless the user 202 subsequently provides acceptable payment in another way, such as via credit card payment in a store at the fueling station site that includes the fuel dispenser 200), and notice of the denied transaction can be provided to the user 202 via the display of the mobile terminal 206 and/or via the fuel dispenser 200 (e.g., via a display thereof, etc.).

In other embodiments, authorization can occur via communication between the mobile terminal 206 and the cloud 232 instead of between the fuel dispenser 200 and the cloud 232, which may facilitate use of electronic wallets with older fuel dispensers that lack the capability to communicate with the cloud 232 to authorize electronic wallet payments or that lack the capability to conform with current data security protocols. The fuel dispenser 200 can transmit cost data to the mobile terminal 206 that is indicative of a total cost of goods/services selected by the user 202 for purchase. In response to receiving the cost data, the mobile terminal 206 can transmit authorization data to the cloud 232 which verifies that the user's electronic wallet as identified by the authorization data is a valid account and has sufficient funds to pay the monetary amount indicated in the authorization data as being needed to purchase the desired goods/services, and then the cloud 232 transmits verification data to the mobile terminal 206 indicating that the charge has been authorized or not. In response to receiving verification data indicative of authorization, the mobile terminal 206 can transmit approval data to the fuel dispenser 200 indicating that the selected goods/service have been approved for provision to the user 202, thereby indicating that the fuel dispenser 200 can provide those goods/services to the user 202. Also in response to receiving verification data indicative of authorization, the app can update to reflect the completed transaction. In response to receiving verification data indicative of no authorization, the mobile terminal 206 can transmit disapproval data to the fuel dispenser 200 indicating that the selected goods/service have not been approved for provision to the user 202, thereby preventing the fuel dispenser 200 from providing the selected goods/services to the user 202 (unless the user 202 subsequently provides acceptable payment in another way, such as via credit card payment in a store at the fueling station site that includes the fuel dispenser 200).

In another embodiment of a process of managing payment that includes loading currency into an electronic wallet, a currency acceptance terminal is integrated into a point of sale (POS) terminal that is manned by a cashier or other authorized personnel, such as a POS terminal inside a store at a fuel dispensing site. The process is similar to the processes 100, 200 discussed above but instead of a user inserting currency into a currency acceptance terminal, the user provides the currency to the cashier or other authorized personnel who inserts the currency into the POS terminal that includes the currency acceptance terminal. This process may allow a merchant who does not accept cash for payment to allow a user to pay with cash by loading the cash into the user's electronic wallet and then using the electronic wallet to pay for goods/services.

One skilled in the art will appreciate further features and advantages of the invention based on the above-described embodiments. Accordingly, the invention is not to be limited by what has been particularly shown and described, except as indicated by the appended claims. All publications and references cited herein are expressly incorporated herein by reference in their entirety.

What is claimed is:

1. A payment management system, comprising:
a currency acceptance terminal configured to receive currency in association with an electronic wallet of a user that stores monetary value usable for purchase of at least one of goods and services from a merchant;
a mobile terminal that is separate from and external to the currency acceptance terminal; and
a fuel dispenser, the fuel dispenser being separate from and external to the currency acceptance terminal, the mobile terminal, and an electronic wallet management system, wherein:
the currency acceptance terminal is configured to transmit data indicative of a monetary amount of the received currency to the mobile terminal;
the mobile terminal is configured to transmit data indicative of the monetary amount to an electronic wallet management system that manages a plurality of electronic wallets including the electronic wallet of the user, the electronic wallet management system being separate from and external to the currency acceptance terminal and the mobile terminal;
the mobile terminal is configured to receive data from the electronic wallet management system indicative of the stored monetary value of the electronic wallet of the user and to transmit the data indicative of the stored monetary value of the electronic wallet of the user to the fuel dispenser;
the fuel dispenser is configured to determine an amount of payment to be made from the electronic wallet of the user based on a selection of goods and/or services received via the fuel dispenser from the user, the selection including fuel to be dispensed from the fuel dispenser;
the fuel dispenser is configured to compare the stored monetary value of the electronic wallet of the user received from the mobile terminal with the determined amount of payment to be made from the electronic wallet of the user without communicating with the electronic wallet management system;
the fuel dispenser is configured to receives an instruction causing the fuel dispenser to dispense the fuel from the fuel dispenser;
the mobile terminal is configured to transmit data to the fuel dispenser that is indicative of an approval of payment to be made from the electronic wallet of the user for fuel to be dispensed from the fuel dispenser;

in response to the mobile terminal transmitting to the fuel dispenser the data indicative of the approval of payment to be made, the mobile terminal is configured to receive data from the fuel dispenser indicative of a total cost of the fuel dispensed from the fuel dispenser; and in response to receiving the data from the fuel dispenser that is indicative of the total cost, the mobile terminal is configured to transmit data to the electronic wallet management system indicative of the total cost of the fuel.

2. The system of claim 1, wherein the currency acceptance terminal has a secure depository therein that stores the received currency therein.

3. The system of claim 1, wherein the received currency includes at least one of paper money and a coin.

4. The system of claim 1, wherein the currency acceptance terminal is configured to be unmanned when receiving the currency and transmitting the data indicative of the monetary amount of the received currency to the mobile terminal.

5. The system of claim 1, wherein, in response to the receipt of the currency, the currency acceptance terminal is configured to automatically transmit the data indicative of the monetary amount of the received currency to the mobile terminal.

6. A payment management method, comprising:
receiving currency at a currency acceptance terminal;
transmitting data indicative of a monetary amount of the received currency from the currency acceptance terminal to a mobile terminal that is separate from and external to the currency acceptance terminal;
transmitting data indicative of the monetary amount from the mobile terminal to an electronic wallet management system that manages a plurality of electronic wallets including an electronic wallet of a user that stores monetary value usable for purchase of at least one of goods and services from a merchant, the electronic wallet management system being separate from and external to the currency acceptance terminal and the mobile terminal;
increasing the stored monetary value of the electronic wallet of the user at the electronic wallet management system by the monetary amount;
after increasing the stored monetary value of the electronic wallet of the user, transmitting data indicative of the stored monetary value of the electronic wallet of the user from the electronic wallet management system to the mobile terminal;
transmitting data indicative of payment to be made for fuel from the electronic wallet of the user and the data indicative of the stored monetary value of the electronic wallet of the user from the mobile terminal to a fuel dispenser configured to dispense the fuel;
after transmitting the data indicative of the payment and the stored monetary value, the fuel dispenser comparing the stored monetary value of the electronic wallet of the user with the payment to be made from the electronic wallet of the user and transmitting data indicative of the comparison to the mobile terminal, the comparing performed without communicating with the electronic wallet management system; and
dispensing the fuel from the fuel dispenser.

7. The method of claim 6, further comprising, prior to receiving the currency, electronically connecting the mobile terminal and the currency acceptance terminal.

8. The method of claim 7, wherein the electronically connecting includes using an app installed on the mobile terminal.

9. The method of claim 6, wherein the received currency is deposited in a secure depository within the currency acceptance terminal.

10. The method of claim 6, wherein the received currency includes at least one of paper money and a coin.

11. The method of claim 6, wherein the currency acceptance terminal is unmanned.

12. The method of claim 6, wherein the electronic wallet management system is cloud-based and includes a memory storing the plurality of electronic wallets.

13. The method of claim 6, wherein the currency acceptance terminal is unmanned and the fuel dispenser is unmanned.

14. A payment management method, comprising:
receiving at a mobile terminal data from an unmanned currency acceptance terminal that is indicative of a monetary value of currency received by and stored in the currency acceptance terminal;
transmitting from the mobile terminal to a cloud-based electronic wallet management system data indicative of the monetary value of the received currency and data indicative of an electronic wallet that is uniquely associated with a user of the mobile terminal and that is stored at the cloud-based electronic wallet management system;
receiving at the mobile terminal data from the cloud-based electronic wallet management system data indicative of the electronic wallet having been updated to reflect the monetary value of the currency;
transmitting from the mobile terminal to a fuel dispenser data indicative of a stored monetary value of the electronic wallet of the user;
determining, by the fuel dispenser and from the data indicative of a stored monetary value of the electronic wallet of the user received by the fuel dispenser from the mobile terminal, a payment to be made from the electronic wallet of the user based on a selection of goods/services received via the fuel dispenser from the user, the selection including fuel to be dispensed from the fuel dispenser;
comparing, by the fuel dispenser, the stored monetary value of the electronic wallet of the user received from the mobile terminal with the determined payment to be made from the electronic wallet of the user, the comparing performed without communicating with the cloud-based electronic wallet management system;
dispensing the fuel from the fuel dispenser; and
receiving at the mobile terminal data from the fuel dispenser indicative of the fuel having been dispensed from the fuel dispenser and as having been paid for from the electronic wallet.

15. The method of claim 14, wherein the currency includes at least one of paper money and a coin.

16. The system of claim 1, wherein, of the mobile terminal and the currency acceptance terminal, only the mobile terminal is configured to transmit data indicative of the monetary amount of the received currency to the electronic wallet management system.

* * * * *